(12) United States Patent
Chrysos et al.

(10) Patent No.: US 8,984,206 B2
(45) Date of Patent: Mar. 17, 2015

(54) WEIGHTAGE-BASED SCHEDULING FOR HIERARCHICAL SWITCHING FABRICS

(71) Applicant: International Business Machines Corporation, Armonk, NY (US)

(72) Inventors: Nikolaos Chrysos, Thalwil (CH); Girish Gopala Kurup, Bangalore (IN); Cyriel J. Minkenberg, Gutenswil (CH); Anil Pothireddy, Bangalore (IN); Vibhor K. Srivastava, Sitapur Uttar Pradesh (IN); Brian T. Vanderpool, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 13/664,794

(22) Filed: Oct. 31, 2012

(65) Prior Publication Data

US 2014/0122771 A1    May 1, 2014

(51) Int. Cl.
| | | |
|---|---|---|
| *G06F 13/00* | (2006.01) | |
| *G06F 13/40* | (2006.01) | |
| *G06F 13/36* | (2006.01) | |

(52) U.S. Cl.
CPC .......... *G06F 13/4022* (2013.01); *G06F 13/36* (2013.01)
USPC ............................ 710/317; 710/309; 710/112

(58) Field of Classification Search
CPC ............................ G06F 13/4031; G06F 13/36
USPC .......................... 710/309, 316–317, 112–119
See application file for complete search history.

(56) References Cited

U.S. PATENT DOCUMENTS

| | | | |
|---|---|---|---|
| 5,299,190 | A | 3/1994 | LaMaire et al. |
| 5,483,521 | A | 1/1996 | Aramaki |
| 5,689,644 | A | 11/1997 | Chou et al. |
| 6,052,368 | A | 4/2000 | Aybay |
| 6,215,788 | B1 | 4/2001 | Sakurai et al. |
| 6,735,203 | B1 | 5/2004 | Heiman |
| 6,804,743 | B2 | 10/2004 | Manning |
| 6,888,841 | B1 | 5/2005 | Ozaki |
| 6,954,811 | B2 * | 10/2005 | Vishnu .......................... 710/113 |
| 7,158,512 | B1 | 1/2007 | Kamhine |
| 7,173,906 | B2 | 2/2007 | Ravi et al. |
| 7,292,594 | B2 | 11/2007 | Meempat et al. |
| 7,492,782 | B2 | 2/2009 | Jun et al. |
| 7,539,199 | B2 | 5/2009 | Shrimali et al. |
| 7,609,695 | B2 | 10/2009 | Zhu et al. |
| 7,643,493 | B1 | 1/2010 | Sayrafian-Pour |
| 7,778,254 | B2 | 8/2010 | Kadambi et al. |

(Continued)

OTHER PUBLICATIONS

McKeown, "The iSLIP Scheduling Algorithm for Input-Queued Switches," IEEE/ACM Transactions on Networking, vol. 7, No. 2; Apr. 1999.

(Continued)

*Primary Examiner* — Raymond Phan
(74) *Attorney, Agent, or Firm* — Patterson & Sheridan, LLP

(57) ABSTRACT

Techniques are disclosed to implement a scheduling scheme for a crossbar scheduler that provides distributed request-grant-accept arbitration between input group arbiters and output group arbiters in a distributed switch. Input and output ports are grouped and assigned a respective arbiter. The input group arbiters communicate requests indicating a count of respective ports having data packets to be transmitted via one of the output ports. The output group arbiter attempts to accommodate the requests for each member of an input group before proceeding to a next input group.

24 Claims, 7 Drawing Sheets

(56) References Cited

U.S. PATENT DOCUMENTS

| | | | |
|---|---|---|---|
| 7,826,468 | B2 | 11/2010 | Shimizu et al. |
| 7,830,902 | B2 * | 11/2010 | Ichimiya et al. ............ 370/412 |
| 7,848,341 | B2 | 12/2010 | Benner et al. |
| 8,001,335 | B2 | 8/2011 | Chen et al. |
| 8,059,671 | B2 | 11/2011 | Naven et al. |
| 8,135,024 | B2 | 3/2012 | Abel et al. |
| 8,352,669 | B2 * | 1/2013 | Wu et al. ..................... 710/317 |
| 2001/0053157 | A1 | 12/2001 | Li |
| 2003/0191879 | A1 * | 10/2003 | Marmash .................... 710/113 |
| 2004/0083326 | A1 | 4/2004 | Wang et al. |
| 2005/0117575 | A1 * | 6/2005 | Konda ......................... 370/389 |
| 2008/0253289 | A1 | 10/2008 | Naven et al. |
| 2010/0272117 | A1 | 10/2010 | Wu et al. |
| 2012/0233349 | A1 | 9/2012 | Aybay |

OTHER PUBLICATIONS

Hluchyj et al., "Queueing in High-Performance Packet Switching," IEEE Journal on Selected Areas in Communications, vol. 6, No. 9, Dec. 1988.

Bubenik et al., "Performance of a Broadcast Packet Switch," IEEE Transaction Communications, vol. 37, No. 1, Jan. 1989.

Park et al., "NN Based ATM Cell Scheduling with Queue Length-Based Priority Scheme," IEEE Journal on Selected Areas in Communications, vol. 15, No. 2, Feb. 1997.

Karol et al., "Input Versus Output Queueing on a Space-Division Packet Switch," IEEE Transactions on Communications, vol. COM-35, No. 12, Dec. 1987.

Serpanos et al., "FIRM: A Class of Distributed Scheduling Algorithms for High-speed ATM Switches with Multiple Input Queues," IEEE INFOCOM 2000.

Kim et al., "Microarchitecture of a High-Radix Router," Proceedings of the 32nd International Symposium on Computer Architecture (ISCA'05), IEEE, 2005.

Kar et al., "Reduced Complexity Input Buffered Switches," Hot Interconnects 2000, 6 pages, Jul. 16, 2011.

Chrysos et al., "Scheduling in Switches with Small Internal Buffers," GLOBECOM '05, IEEE Global Telecommunications Conference (IEEE Cat. No. 05CH37720), IEEE, 12 pages, 2005.

U.S. Appl. No. 13/762,583 entitled "Input Buffered Switching Device Including Bypass Logic," filed Feb. 8, 2013 by Nikolaos Chrysos et al.

U.S. Appl. No. 14/012,055 entitled "Implementing Hierarchical High Radix Switch With Timesliced Crossbar," filed Aug. 28, 2013 by Nikolaos Chrysos et al.

* cited by examiner

WEIGHTAGE-BASED SCHEDULING FOR HIERARCHICAL SWITCHING FABRICS

BACKGROUND

Computer systems often use multiple computers that are coupled together in a common chassis. The computers may be separate servers that are coupled by a common backbone within the chassis. Each server is a pluggable board that includes at least one processor, an on-board memory, and an Input/Output (I/O) interface. Further, the servers may be connected to a switch to expand the capabilities of the servers. For example, the switch may permit the servers to access additional Ethernet networks or Peripheral Component Interconnect Express (PCIe) slots as well as permit communication between servers in the same or different chassis. In addition, multiple switches may also be combined to create a distributed network switch.

SUMMARY

Embodiments disclosed herein provide a computer-implemented method, computer program product, and system to perform an operation to implement a scheduling scheme for a crossbar scheduler that provides distributed request-grant-accept arbitration between input group arbiters and output group arbiters in a distributed switch. The operation begins by receiving, at an output group arbiter communicably coupled to an output group, a request signal and a count from an input arbiter communicably coupled to a first input group. The output group includes multiple output ports of the distributed switch, and the first input group includes multiple input ports of the distributed switch. The request signal indicates that one or more of the input ports of the input group arbiter have queued data packets targeting a set of output ports including a first output port of the output group arbiter. The count indicates a number of input ports of the input group arbiter having queued data packets targeting the set of output ports. The operation then performs a predefined arbitration operation for at least one input link of the first input group identified as having queued data packets targeting the set of output ports. The predefined arbitration operation is performed for the at least one input link of the first input group prior to performing the predefined arbitration operation on data packets of at least one input link of a second output group.

BRIEF DESCRIPTION OF THE SEVERAL VIEWS OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
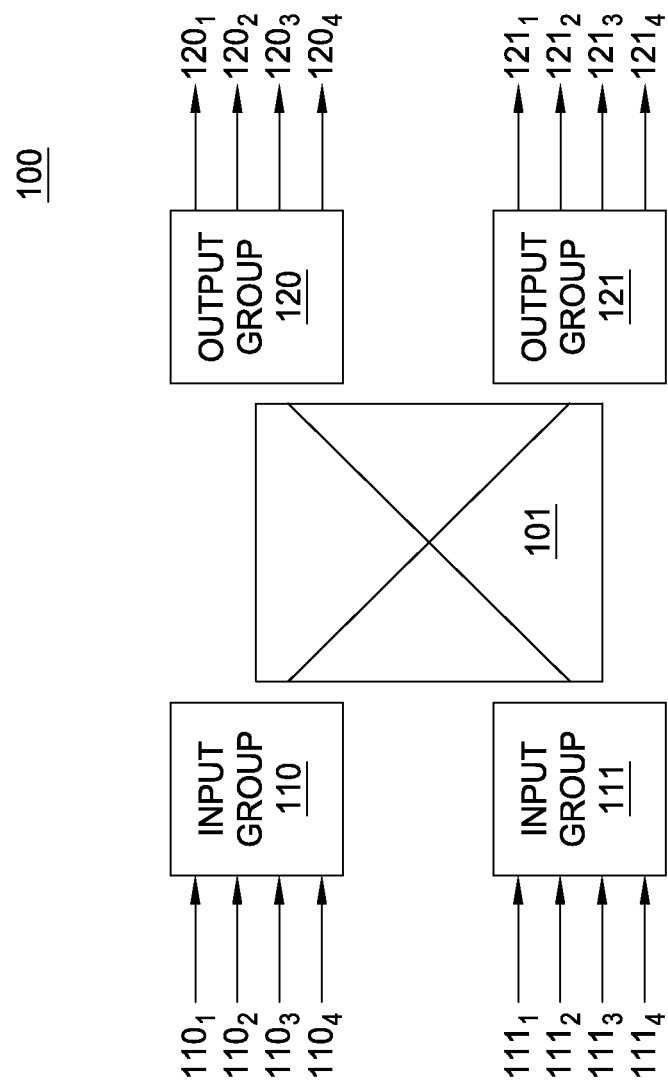
FIG. 1 is a schematic illustrating a crossbar scheduler to implement weightage-based scheduling schemes in hierarchical switching fabrics, according to one embodiment disclosed herein.

Embodiments disclosed herein provide techniques to implement a fair scheduling scheme for a crossbar scheduler that provides distributed request-grant-accept arbitration between input arbiters and output arbiters in a distributed switch. Crossbars are components serving as basic building blocks for on-chip interconnects and large, off-chip switching fabrics, such as those found in data centers. High-radix crossbars, i.e. crossbars with many ports, are often desired, as they allow creating large networks with fewer silicon chips and thus for a lower cost. Despite technology scaling, crossbar port scaling may be restricted by the quadratic cost of crossbars, as well as by the targeted port speed, which also increases from one silicon generation to the next. Even where routing a large number of wires in a small area of silicon seems feasible on paper, placement-and-routing tools may often find it difficult to achieve efficient routing of such a large number of wires.

The same may hold true for crossbar schedulers, which should preferably also scale together with the crossbar datapath. Crossbar schedulers may often be based on a distributed request-grant arbitration, between input and output arbiters. Flat schedulers, having one arbiter for each input and output port, may often achieve the best delay-throughput and fairness performance.

However, routing wires between N input and N output arbiters may require a full-mesh interconnect, with quadratic cost, which may become expensive for crossbars with more than 64 ports. To overcome this cost, hierarchical scheduling solutions may be used. To that end, inputs may be organized in groups—for example, quads—and arbitration is performed at the quad level rather than at an input level.

Although quad-based scheduling reduces the number of wires that are to be routed within the chip area dedicated to the crossbar scheduler, quad-based scheduling may also compromise fairness at least in some instances. While fairness may be provided at the quad-level, i.e., that all input quads get the same service from each output subport, fairness on the port-level may be sacrificed, because a quad with many input ports active and requesting the same output port may get the same service as another input quad with only one active input port. An input arbiter may also be referred to herein as an input group arbiter, and an output arbiter may also be referred to herein as an output group arbiter.

Accordingly, one embodiment provides an operation to implement a scheduling scheme for a crossbar scheduler that provides distributed request-grant-accept arbitration between input group arbiters and output group arbiters in a distributed switch. The operation begins by receiving, at an output group arbiter communicably coupled to an output group, a request signal and a count from an input group arbiter communicably coupled to a first input group. The output group includes multiple output ports of the distributed switch, and the first input group includes multiple input ports of the distributed switch. The request signal indicates that one or more of the input ports of the input group arbiter have queued data packets targeting a set of output ports including a first output port of the output group arbiter. The count indicates a number of input ports of the input group arbiter having queued data packets targeting the set of output ports. The operation then performs a predefined arbitration sub-operation for at least one input link of the first input group identified as having queued data packets targeting the set of output ports. The predefined arbitration sub-operation, also referred to herein as the predefined arbitration operation, is performed for the at least one input link of the first input group and prior to performing the predefined arbitration operation on data packets of at least one input link of a second output group.

As such, disclosed embodiments provide a scheduling scheme for quad-based arbitration in a crossbar scheduler that maintains the port-level fairness of a flat scheduler. One embodiment is directed to a distributed switching device having a plurality of input and output ports. The input ports and output ports may be grouped into respective quads, e.g., four ports are grouped together and managed by a respective arbiter. An input port may request an output port when the input port has a packet for that output port in data queues of the input port. The port requests are consolidated by the input groups and sent as consolidated requests to each output, by ORing the respective port requests from the local input ports in that input group. Each output group grants one of the requesting input groups using a rotating priority defined by a predefined pointer, such as a next-to-serve pointer.

When sending a request, the input group communicates to the output group arbiter a count of inputs requesting a given output port. Each output group arbiter may also have an output port arbiter for each output port. When the output port arbiter grants a request of an input group, the output port arbiter latches the corresponding count when this is the first grant in a row from this output to this input group. The output port arbiter then decrements the latched count. If the decremented latch count is greater than zero, then the output port arbiter sets the next-to-serve pointer to the granted input group. On the other hand, if the decremented latch count is zero (i.e., once each requesting input port of the input group has transmitted a packet) and preprogrammed logic regarding the issuance of an accept signal from the input group is satisfied, then the output port arbiter sets the next-to-serve pointer to another input group.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic 100 illustrating a hierarchical crossbar implementing weightage-based scheduling schemes in hierarchical switching fabrics, according to one embodiment disclosed herein. The hierarchical crossbar 101 communicably couples input groups 110-111 to output groups 120-121. Two input and output groups are shown only for clarity; embodiments disclosed herein contemplate any number of input and output groups, respectively. Each input group $110_{1-4}$, $111_{1-4}$ and each output group $120_{1-4}$, $121_{1-4}$ contains an output group arbiter (not pictured), which controls the flow of packets through the crossbar 101. Each output group arbiter may contain a number of per-output port arbiters, also referred to herein as output port arbiters or sub-arbiters. Therefore, the overall hierarchical crossbar 101 comprises N (an integer) input and N output group arbiters. Additionally, each output group arbiter may comprise k (an integer) output port arbiters, as well as other logic. The k output port arbiters may include a PPE arbiter and additional logic. As shown, each input group 110-111 and output group 120-121 bundles input and output ports into "quads." Specifically, four input ports $110_{1-4}$, $111_{1-4}$ are grouped into input groups 110 and 111, respectfully, while four output ports $120_{1-4}$, $121_{1-4}$ are grouped into output groups 120 and 121, respectfully. Each input group 110-111 stores incoming packets from the input ports in virtual output queues (VOQs, not pictured). Packets are dequeued upon receiving an output grant signal from the output port arbiter 120-121. At least in some embodiments, the hierarchical crossbar 101 between input groups and output groups contains no buffers.

Figure 2:
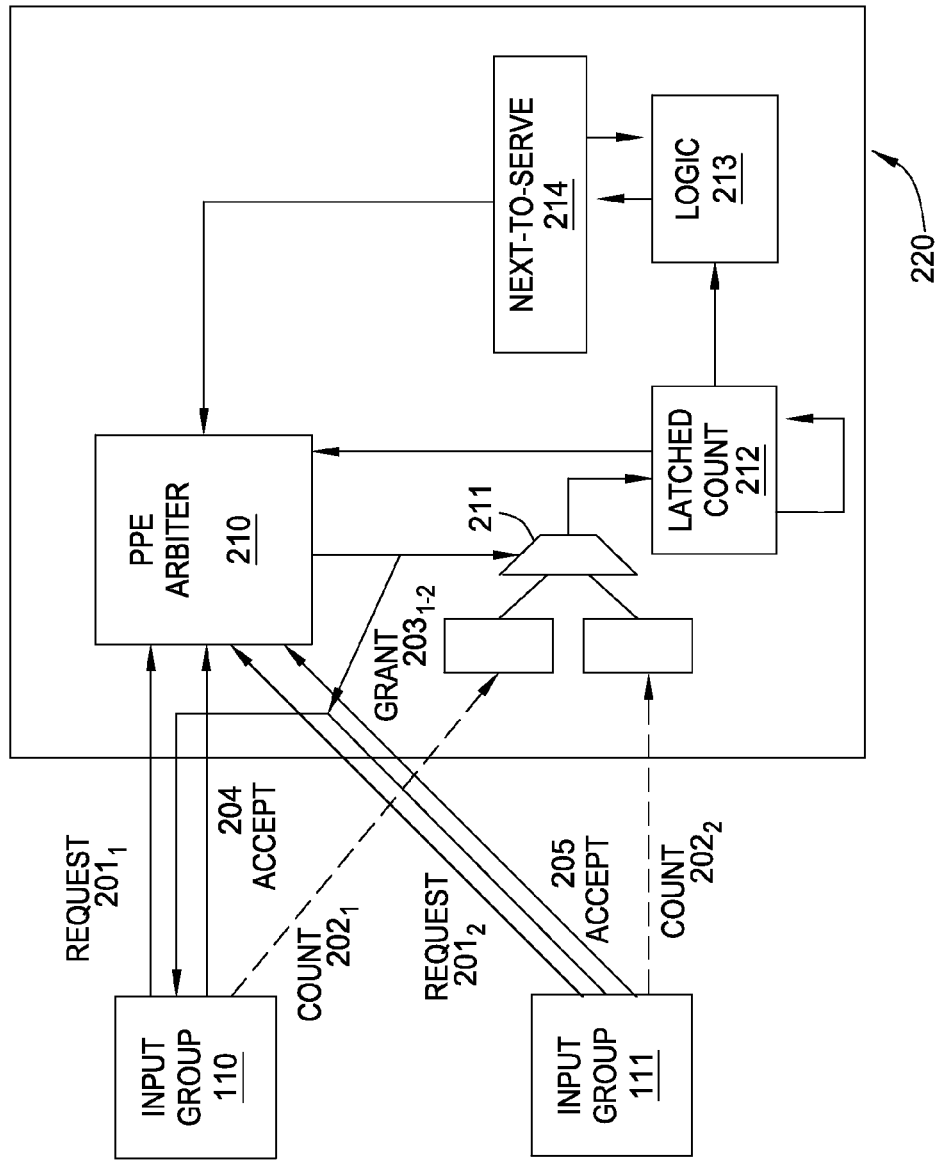
FIG. 2 is a schematic illustrating a detailed view of a crossbar scheduler to implement weightage-based scheduling schemes in hierarchical switching fabrics, according to one embodiment disclosed herein.

FIG. 2 is a schematic 200 illustrating a detailed view of a crossbar scheduler to implement weightage-based scheduling schemes in hierarchical switching fabrics, according to one embodiment disclosed herein. The schematic 200 illustrates the input groups 110-111 and an output port arbiter 220. The output port arbiter 220 includes a programmable priority encoder (PPE) arbiter 210, a multiplexor 211, a latched count 212, a logic 213, and a next-to-serve pointer 214. The scheduling schemes depicted in the schematic 200 are based on a request-grant-accept protocol. The input groups 110-111 send request signals $201_{1-2}$ to the PPE arbiter 210 on behalf of its input ports. In response, the PPE arbiter 210 makes a decision as to which input group to serve (grant). The request signals $201_{1-2}$ indicate that one or more of the input ports of the input groups 110-111 have packets targeting the corresponding to the output port arbiter 220. The PPE arbiter 210 sends a signal to the multiplexor 211, which either selects the input group 110 or 111 based on the value sent by the PPE arbiter 210. The PPE arbiter 210 may select one of the requesting input groups whenever the output line corresponding to the input group is available and has buffer credits.

In one embodiment, in addition to sending a request $201_{1-2}$ to the PPE arbiter 210, the input group 110-111 sends a respective count $202_{1-2}$ to the multiplexor 211. The count $202_{1-2}$ corresponds to the number of input ports of the input group having data packets which are intended for a particular output port of the output group 120. The counts for each output port of the output group 120 may be transmitted independently. In embodiments where the output group 120 has four output ports, for each clock cycle j, the input group communicates the count for output j mod 4. The count of input ports having data packets for a specific output port may be transmitted in clock cycles distinct from the request signals. Stated differently, the count of input ports and the request signals may be decoupled. The respective count $202_{1-2}$ of the selected input group is stored in the latched count 212. For example, output arbiter j stores the communicated counts $202_{1-2}$ in per input group latches, in clock cycle j mod k. In embodiments where the input and output groups have four output groups (and therefore 4 output group arbiters), the communicated counts $202_{1-2}$ will be stored in per input group latches in clock cycle j mod 4. When a new grant $203_{1-2}$ is issued by the PPE arbiter 210, the PPE arbiter 210 decrements the latched count by one. At least in some embodiments, the count is always non-negative.

In one embodiment, the logic 213 controls updating of the next-to-serve pointer 214 based on the latched count 212 and associated, preprogrammed logic regarding a required receipt of accept signals from the input groups. The PPE arbiter of an output port arbiter may scan all input groups, starting with the one pointed to by the next-to-serve pointer 214, and will select the first input group having a request. The next-to-serve pointer 214 indicates which input group should be served next, which in some cases may be set to the currently served input group. At least in some embodiments, the latched count 212 is zero before the next-to-serve pointer 214 is updated. However, in alternative embodiments, the PPE arbiter 210 is to receive an accept signal 204-205 from the input groups 110-111 responsive to a grant $203_{1-2}$, before updating its next to serve pointer. When a grant $203_{1-2}$ is issued, a packet is transmitted by the input group, and the latched count 212 is decremented. However, in some embodiments, the count is not decremented until the grant $203_{1-2}$ is accepted. There may thus be interplay between the latched count 212 and the logic 213 in updating the next-to-serve pointer. If the latched count equals zero (i.e., the currently served input group has no more input ports requesting an output port of the output group 120), the next-to-serve pointer 214 may be moved by one position, to point to the next input group based on the logic 213. The next input group need not issue a request at this point in time to be pointed to by the next-to-serve pointer; however, the PPE arbiter 210 will select this next input group only if it is issuing a request. Otherwise, the currently served input group still has input ports requesting an output port of the output group 120, and the logic 213 keeps the next-to-serve pointer 214 pointing to the accepting input group.

In some embodiments, once the latched count 212 equals zero, the logic 213 may specify that if the PPE arbiter 210 does not receive an accept signal responsive to a grant, the next-to-serve pointer 214, depending on the particular embodiment, may not be updated—or may be updated to the granted (but not accepting) input group, based on the configuration of the logic 213. In alternative embodiments, the next-to-serve pointer 214 is updated when the latched count 212 equals zero—regardless of whether an accept signal has been received by the PPE arbiter 210. Depending on the embodiment, the logic 213 may require an accept signal for each grant signal, at least one accept for a plurality of grants, any combination thereof, etc.

Figure 3:
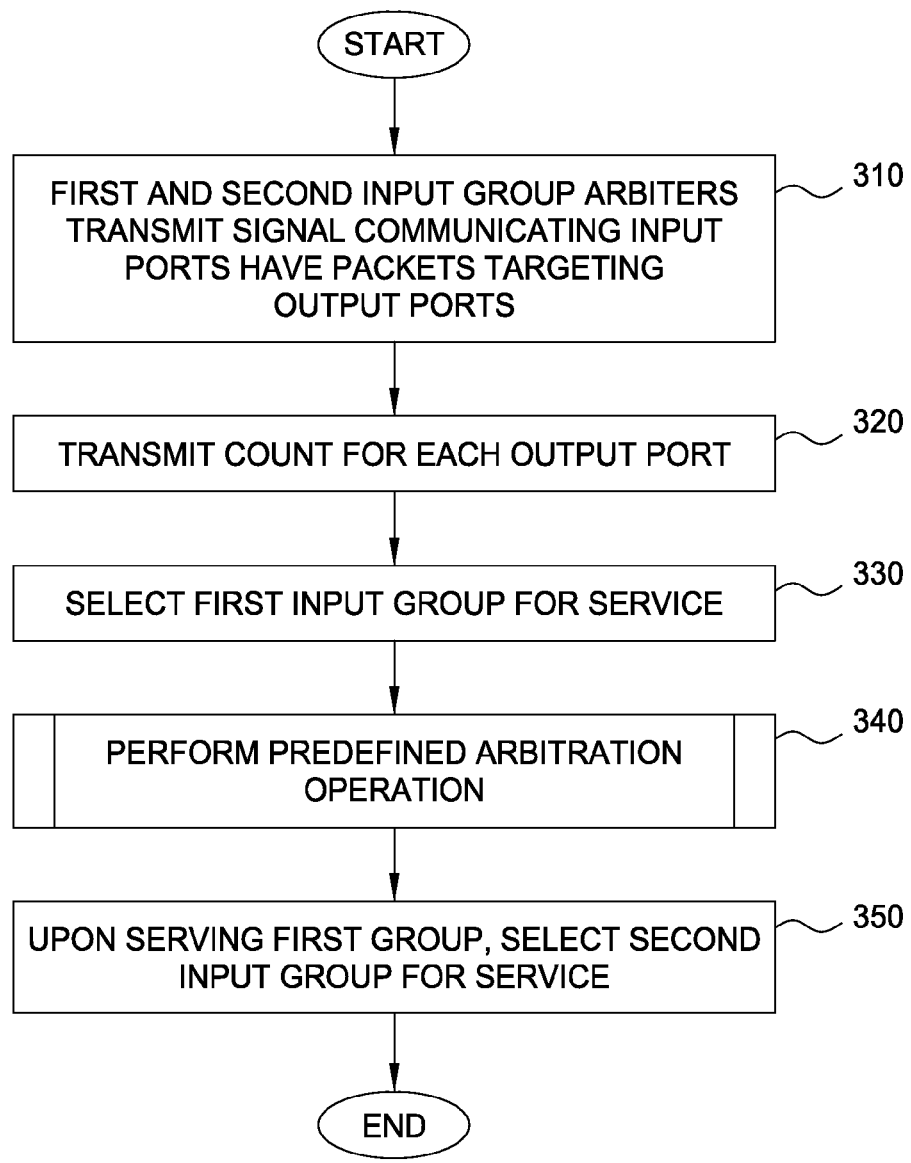
FIG. 3 is a flowchart illustrating a method to provide weightage-based scheduling schemes for crossbar schedulers in hierarchical switching fabrics, according to one embodiment disclosed herein.

FIG. 3 is a flowchart illustrating a method 300 to provide weightage-based scheduling schemes for crossbar schedulers in hierarchical switching fabrics, according to one embodiment disclosed herein. The steps of the method 300 may be performed by a designated component of the hierarchical switching fabric. At step 310, a signal is transmitted by a two input group arbiters communicating that they each have input ports targeting specific output ports. At step 320, the input group arbiters transmit a count of the input ports having data packets targeting each output port to the output group arbiter. The count may be stored in a database or in a latched count mechanism of the output group arbiter. In one embodiment, a count is transmitted for each specific output port j of the output group in clock cycle j mod k, where k is equal to the cardinality of the input groups and/or output groups. At least in some embodiments, the step 320 occurs simultaneously with the step 310. At step 330, the output group arbiter selects a first input group for service. The input group may be selected in sequential order or by any method used to select input groups on a basis of improving fairness. An input group may be selected by the output group when the corresponding output port is available and has buffer credits. At step 340, described in greater detail below with reference to FIG. 4, the output group arbiter performs a predefined arbitration operation. The predefined arbitration operation generally includes executing logic to facilitate transmission of a data packet from an input port to an output port. At step 350, upon serving the first input group arbiter, the output group arbiter selects the second output group for service. Although only two input groups are show as being serviced in conjunction with the method 300, it should be understood that the steps of the method 300 may be repeated as many times as necessary to serve requests from any number of input quads in the hierarchical switching fabric. In some embodiments, steps 310-320 may be performed in a parallel, pipelined fashion, with steps 330 and 340.

Figure 4:
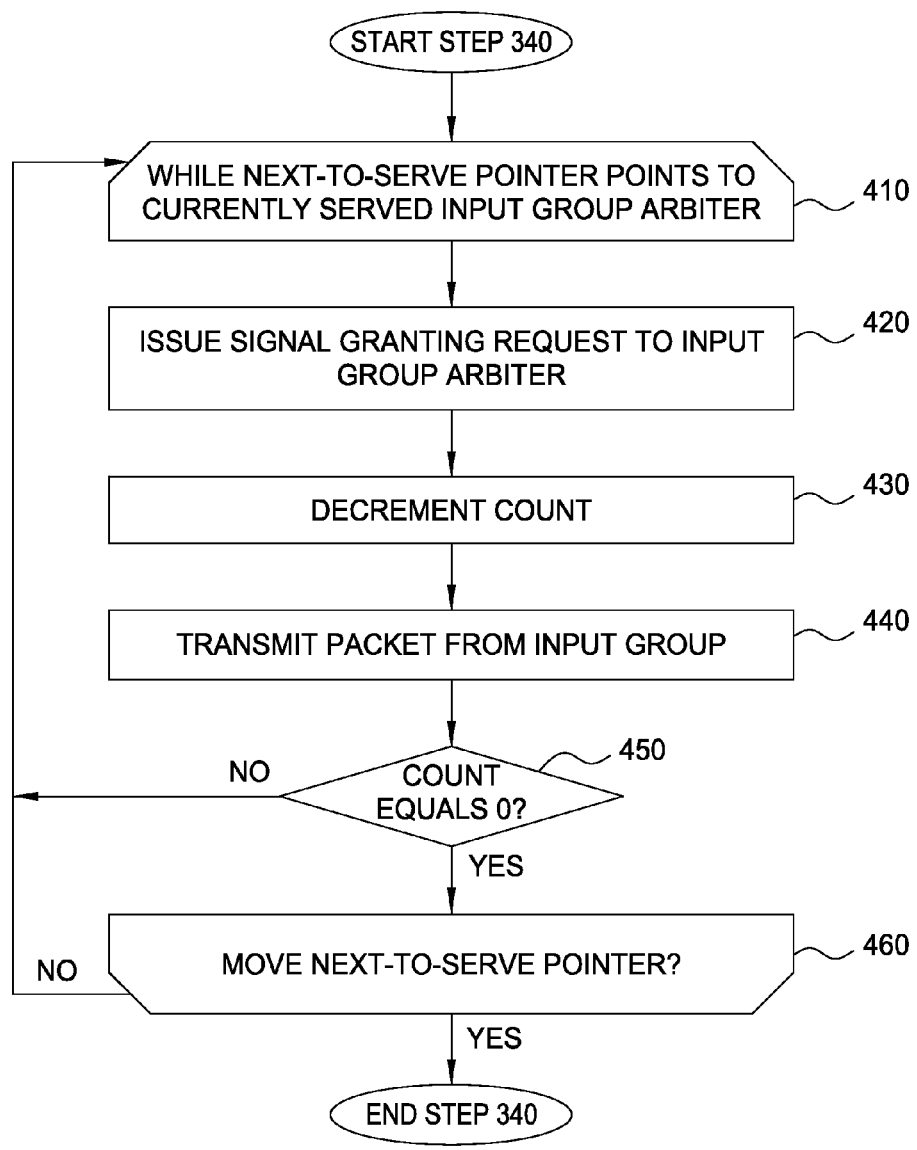
FIG. 4 is a flowchart illustrating a method to perform a predefined arbitration operation, according to one embodiment disclosed herein.

FIG. 4 is a flowchart illustrating a method 400 corresponding to step 340 to perform a predefined arbitration operation, according to one embodiment disclosed herein. The steps of the method 400 may be performed by a designated component of the distributed switch. At step 410, a loop including steps 420-460 is executed while the next-to-serve pointer of the output group arbiter points to the currently served input group. At step 420, a signal granting a request is issued to the currently served input group arbiter. At step 430, the count is decremented. In one embodiment, the count is decremented immediately upon issuing the grant. In another embodiment, the count is decremented only if an accept signal is communicated by the input arbiter responsive to the grant. At step 440, a queued packet is transmitted from the input group. At step 450, the output group arbiter determines whether the count equals zero. If the count does not equal zero, i.e., the currently served input group arbiter has input ports which are entitled to transmit packets, the method returns to step 410. If the count equals zero, all requesting ports of the input group are considered to have transmitted packets, and the method proceeds to step 460. At step 460, the output group arbiter determines whether to update its next-to-serve pointer. Based on the preprogrammed logic of the output group arbiter, the next-to-serve pointer may be incremented (i.e., moved to the next input group arbiter) in differing scenarios. Because the crossbar scheduler operates on a request-grant-accept protocol, the output arbiter may be programmed to wait for an accept signal before updating the next-to-serve pointer and moving to another input group arbiter. Doing so allows the output arbiter to effectively confirm that a grant has been accepted and a packet has been transmitted before moving to the next input group arbiter. However, if a packet is transmitted by the input group on the data path at step 440, the accept signal is also guaranteed to be issued at the same time in the control/scheduler path.

In one embodiment, the output arbiter may be programmed to require receipt of an accept signal for each grant signal, before updating the next-to-serve pointer. In another embodiment, not every grant signal has a corresponding accept signal that is received, before the next-to-serve pointer is updated. For example, assume that the first, third, and fourth grant signals may each lead to receipt of a respective accept signal, but the second grant does not lead to receipt of any accept signal. In this particular example, the output group arbiter may nevertheless update its next-to-serve pointer. In yet another embodiment, the next-to-serve pointer is not updated until a grant signal leads to receipt of an accept signal. For example, where k=4, assume that six grant signals are be issued, but only the sixth grant signal leads to receipt of a corresponding accept signal. In this particular example, the next-to-serve pointer would not be updated until the sixth grant is received—even though the input group has transmitted more than four packets—e.g., more than its fair share under the scheduling scheme, according to some embodiments. In still another embodiment, the next-to-serve pointer may be updated if an accept signal was previously received, even though the count may not have been zero at the time the accept signal was transmitted. For example, assume that the first and third grant signals lead to receipt of respective accept signals, but the second and fourth grant signals do not lead to receipt of any accept signals. In this particular example, the next-to-serve pointer is updated, because the count equals zero and a grant signal was previously seen. If the next-to-serve pointer is not updated, the method returns to step 410. Otherwise, the method 400 terminates for the currently served input group, and another input group may be selected, as described above in further detail in conjunction with FIG. 3.

Figure 5:
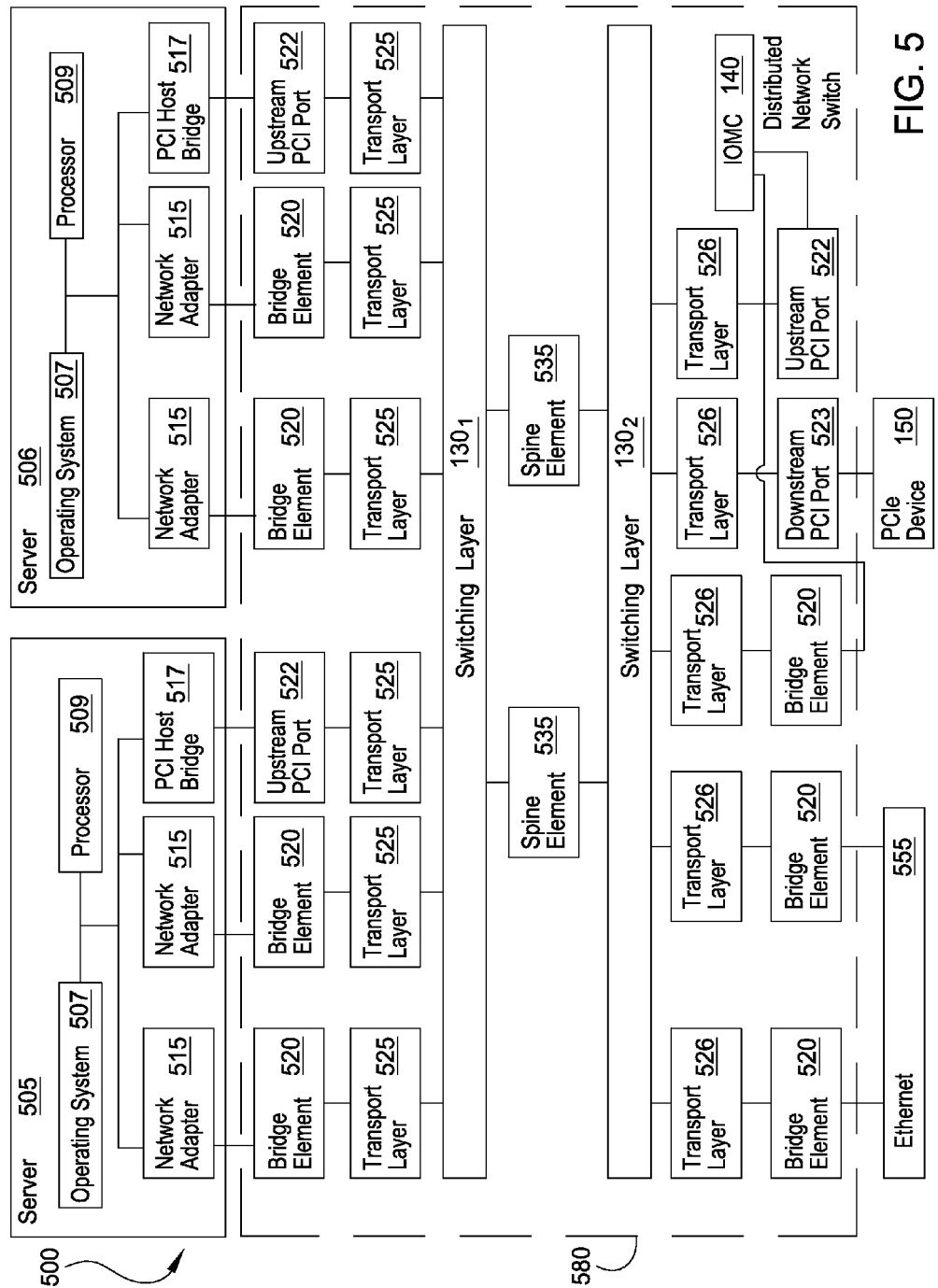
FIG. 5 illustrates a system architecture that includes a distributed, virtual switch, according to one embodiment described herein.

FIG. 5 illustrates a system architecture 500 that includes a distributed, virtual switch, according to one embodiment described herein. The first server 505 may include at least one processor 509 coupled to a memory (not pictured). The processor 509 may represent one or more processors (e.g., microprocessors) or multi-core processors. The memory may represent random access memory (RAM) devices comprising the main storage of the server 505, as well as supplemental levels of memory, e.g., cache memories, non-volatile or backup memories (e.g., programmable or flash memories), read-only memories, and the like. In addition, the memory may be considered to include memory storage physically located in the server 505 or on another computing device coupled to the server 505.

The server 505 may operate under the control of an operating system 507 and may execute various computer software applications, components, programs, objects, modules, and data structures, such as virtual machines (not pictured).

The server 505 may include network adapters 515 (e.g., converged network adapters). A converged network adapter may include single root I/O virtualization (SR-IOV) adapters such as a Peripheral Component Interconnect Express (PCIe) adapter that supports Converged Enhanced Ethernet (CEE). Another embodiment of the system 500 may include a multi-root I/O virtualization (MR-IOV) adapter. The network adapters 515 may further be used to implement of Fiber Channel over Ethernet (FCoE) protocol, RDMA over Ethernet, Internet small computer system interface (iSCSI), and the like. In general, a network adapter 515 transfers data using an Ethernet or PCI based communication method and may be coupled to one or more of the virtual machines. Additionally, the adapters may facilitate shared access between the virtual machines. While the adapters 515 are shown as being included within the server 505, in other embodiments, the adapters may be physically distinct devices that are separate from the server 505.

In one embodiment, each network adapter 515 may include a converged adapter virtual bridge (not shown) that facilitates data transfer between the adapters 515 by coordinating access to the virtual machines (not pictured). Each converged adapter virtual bridge may recognize data flowing within its domain (i.e., addressable space). A recognized domain address may be routed directly without transmitting the data outside of the domain of the particular converged adapter virtual bridge.

Each network adapter 515 may include one or more Ethernet ports that couple to one of the bridge elements 520. Additionally, to facilitate PCIe communication, the server may have a PCI Host Bridge 517. The PCI Host Bridge 517 would then connect to an upstream PCI port 522 on a switch element in the distributed switch 580. The data is then routed via a first switching layer $530_1$ to one or more spine elements 535. The spine elements 535 contain the hierarchical crossbar schedulers (not pictured), which perform the arbitration operations described above. The data is then routed from the spine elements 535 via the second switching layer $530_2$ to the correct downstream PCI port 523 which may be located on the same or different switch module as the upstream PCI port 522. The data may then be forwarded to the PCI device 550. While the switching layers $530_{1-2}$ are depicted as separate, they logically represent different passes through the same switching layer 530, before and after being routed through one of the spine elements 535.

The bridge elements 520 may be configured to forward data frames throughout the distributed virtual switch 580. For example, a network adapter 515 and bridge element 520 may be connected using two 40 Gbit Ethernet connections or one 100 Gbit Ethernet connection. The bridge elements 520 forward the data frames received by the network adapter 515 to the first switching layer $530_1$, which is then routed through a spine element 535, and through the second switching layer $530_2$. The bridge elements 520 may include a lookup table that stores address data used to forward the received data frames. For example, the bridge elements 520 may compare address data associated with a received data frame to the address data stored within the lookup table. Thus, the network adapters 515 do not need to know the network topology of the distributed switch 580.

The distributed virtual switch 580, in general, includes a plurality of bridge elements 520 that may be located on a plurality of a separate, though interconnected, hardware components. To the perspective of the network adapters 515, the switch 580 acts like one single switch even though the switch 580 may be composed of multiple switches that are physically located on different components. Distributing the switch 580 provides redundancy in case of failure.

Each of the bridge elements 520 may be connected to one or more transport layer modules 525 that translate received data frames to the protocol used by the switching layers $530_{1-2}$. For example, the transport layer modules 525 may translate data received using either an Ethernet or PCI communication method to a generic data type (i.e., a cell) that is transmitted via the switching layers $530_{1-2}$ (i.e., a cell fabric). Thus, the switch modules comprising the switch 580 are compatible with at least two different communication protocols—e.g., the Ethernet and PCIe communication standards. That is, at least one switch module has the necessary logic to transfer different types of data on the same switching layers $530_{1-2}$.

Although not shown in FIG. 5, in one embodiment, the switching layers $530_{1-2}$ may comprise a local rack interconnect with dedicated connections which connect bridge elements 520 located within the same chassis and rack, as well as links for connecting to bridge elements 520 in other chassis and racks.

After the spine element 535 routes the cells, the switching layer $530_2$ may communicate with transport layer modules 526 that translate the cells back to data frames that correspond to their respective communication protocols. A portion of the bridge elements 520 may facilitate communication with an Ethernet network 555 which provides access to a LAN or WAN (e.g., the Internet). Moreover, PCI data may be routed to a downstream PCI port 523 that connects to a PCIe device 450. The PCIe device 550 may be a passive backplane interconnect, as an expansion card interface for add-in boards, or common storage that can be accessed by any of the servers connected to the switch 580.

Although "upstream" and "downstream" are used to describe the PCI ports, this is only used to illustrate one possible data flow. For example, the downstream PCI port 523 may in one embodiment transmit data from the connected to the PCIe device 550 to the upstream PCI port 522. Thus, the PCI ports 522, 523 may both transmit as well as receive data.

A second server 506 may include a processor 509 connected to an operating system 507 and memory (not pictured) which includes one or more virtual machines similar to those found in the first server 505. The memory of server 506 also includes a hypervisor (not pictured) with a virtual bridge (not pictured). The hypervisor manages data shared between different virtual machines. Specifically, the virtual bridge allows direct communication between connected virtual machines rather than requiring the virtual machines to use the bridge elements 520 or switching layers $530_{1-2}$ to transmit data to other virtual machines communicatively coupled to the hypervisor.

An Input/Output Management Controller (IOMC) 540 (i.e., a special-purpose processor) is coupled to at least one bridge element 520 or upstream PCI port 522 which provides the IOMC 540 with access to the second switching layer $530_2$. One function of the IOMC 540 may be to receive commands from an administrator to configure the different hardware elements of the distributed virtual switch 580. In one embodiment, these commands may be received from a separate switching network from the second switching layer $530_2$.

Although one IOMC 540 is shown, the system 500 may include a plurality of IOMCs 540. In one embodiment, these IOMCs 540 may be arranged in a hierarchy such that one IOMC 540 is chosen as a master while the others are delegated as members (or slaves).

Figure 6:
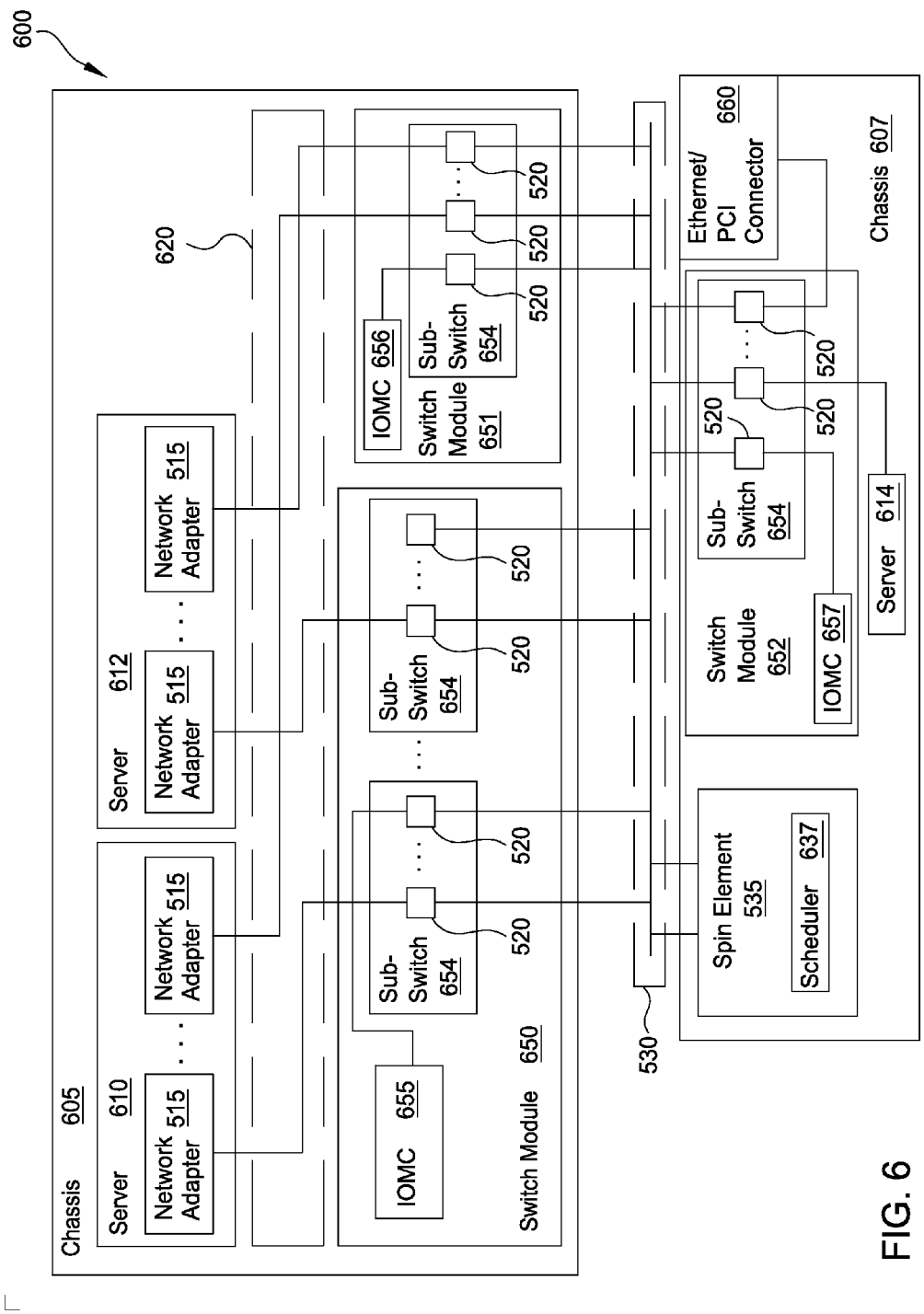
FIG. 6 illustrates a hardware representation of a system that implements a distributed, virtual switch, according to one embodiment described herein.

FIG. 6 illustrates a hardware level diagram 600 of the system 500, according to one embodiment described herein. Server 610 and 612 may be physically located in the same chassis 605; however, the chassis 605 may include any number of servers. The chassis 605 also includes a plurality of switch modules 650, 651 that include one or more sub-switches 654 (i.e., a microchip). In one embodiment, the switch modules 650, 651, 652 are hardware components (e.g., PCB boards, FPGA boards, etc.) that provide physical support and connectivity between the network adapters 515 and the bridge elements 520. In general, the switch modules 650, 651, 652 include hardware that connects different chassis 605, 607 and servers 610, 612, 614 in the system 600 and may be a single, replaceable part in the computing system.

The switch modules 650, 651, 652 (e.g., a chassis interconnect element) include one or more sub-switches 654 and an IOMC 655, 656, 657. The sub-switches 654 may include a logical or physical grouping of bridge elements 520—e.g., each sub-switch 654 may have five bridge elements 520. Each bridge element 520 may be physically connected to the servers 610, 612. For example, a bridge element 520 may route data sent using either Ethernet or PCI communication protocols to other bridge elements 520 attached to the switching layer 530 using the routing layer. However, in one embodiment, the bridge element 520 may not be needed to provide connectivity from the network adapter 515 to the switching layer 530 for PCI or PCIe communications.

The spine element 535 allows for enhanced switching capabilities by connecting N number of sub-switches 654 using less than N connections, as described above. To facilitate the flow of traffic between the N switch elements, the spine element 535 has a hierarchical crossbar scheduler 637 which perform the arbitration operations described above. The inputs ports coming from different sub-switches 654 are grouped into input quads or groups on the spine element 535. The input groups communicate to the crossbar scheduler 637 when one or more of their input ports have packets targeting an output port of the spine element 535, which are also grouped into quads. As described above, the crossbar scheduler 637 provides port-level fairness by granting each input port in the input group an opportunity to send a packet before moving on to another input group.

Each switch module 650, 651, 652 includes an IOMC 655, 656, 657 for managing and configuring the different hardware resources in the system 600. In one embodiment, the respective IOMC for each switch module 650, 651, 652 may be responsible for configuring the hardware resources on the particular switch module. However, because the switch modules are interconnected using the switching layer 530, an IOMC on one switch module may manage hardware resources on a different switch module. As discussed above, the IOMCs 655, 656, 657 are attached to at least one sub-switch 654 (or bridge element 520) in each switch module 650, 651, 652 which enables each IOMC to route commands on the switching layer 530. For clarity, these connections for IOMCs 656 and 657 have been omitted. Moreover, switch modules 651, 652 may include multiple sub-switches 654.

The dotted line in chassis 605 defines the midplane 620 between the servers 610, 612 and the switch modules 650, 651. That is, the midplane 620 includes the data paths (e.g., conductive wires or traces) that transmit data between the network adapters 515 and the sub-switches 654.

Each bridge element 520 connects to the switching layer 530 via the routing layer. In addition, a bridge element 520 may also connect to a network adapter 515 or an uplink. As used herein, an uplink port of a bridge element 520 provides a service that expands the connectivity or capabilities of the system 600. As shown in chassis 607, one bridge element 520 includes a connection to an Ethernet or PCI connector 660. For Ethernet communication, the connector 660 may provide the system 600 with access to a LAN or WAN (e.g., the Internet). Alternatively, the port connector 660 may connect the system to a PCIe expansion slot—e.g., PCIe device 550. The device 550 may be additional storage or memory which each server 610, 612, 614 may access via the switching layer 530. Advantageously, the system 600 provides access to a switching layer 530 that has network devices that are compatible with at least two different communication methods.

As shown, a server 610, 612, 614 may have a plurality of network adapters 515. This provides redundancy if one of these adapters 515 fails. Additionally, each adapter 515 may be attached via the midplane 620 to a different switch module 650, 651, 652. As illustrated, one adapter of server 610 is communicatively coupled to a bridge element 520 located in switch module 650 while the other adapter is connected to a bridge element 520 in switch module 651. If one of the switch modules 650, 651 fails, the server 610 is still able to access the switching layer 530 via the other switching module. The failed switch module may then be replaced (e.g., hot-swapped) which causes the IOMCs 655, 656, 657 and bridge elements 520 to update the routing tables and lookup tables to include the hardware elements on the new switching module.

Figure 7:
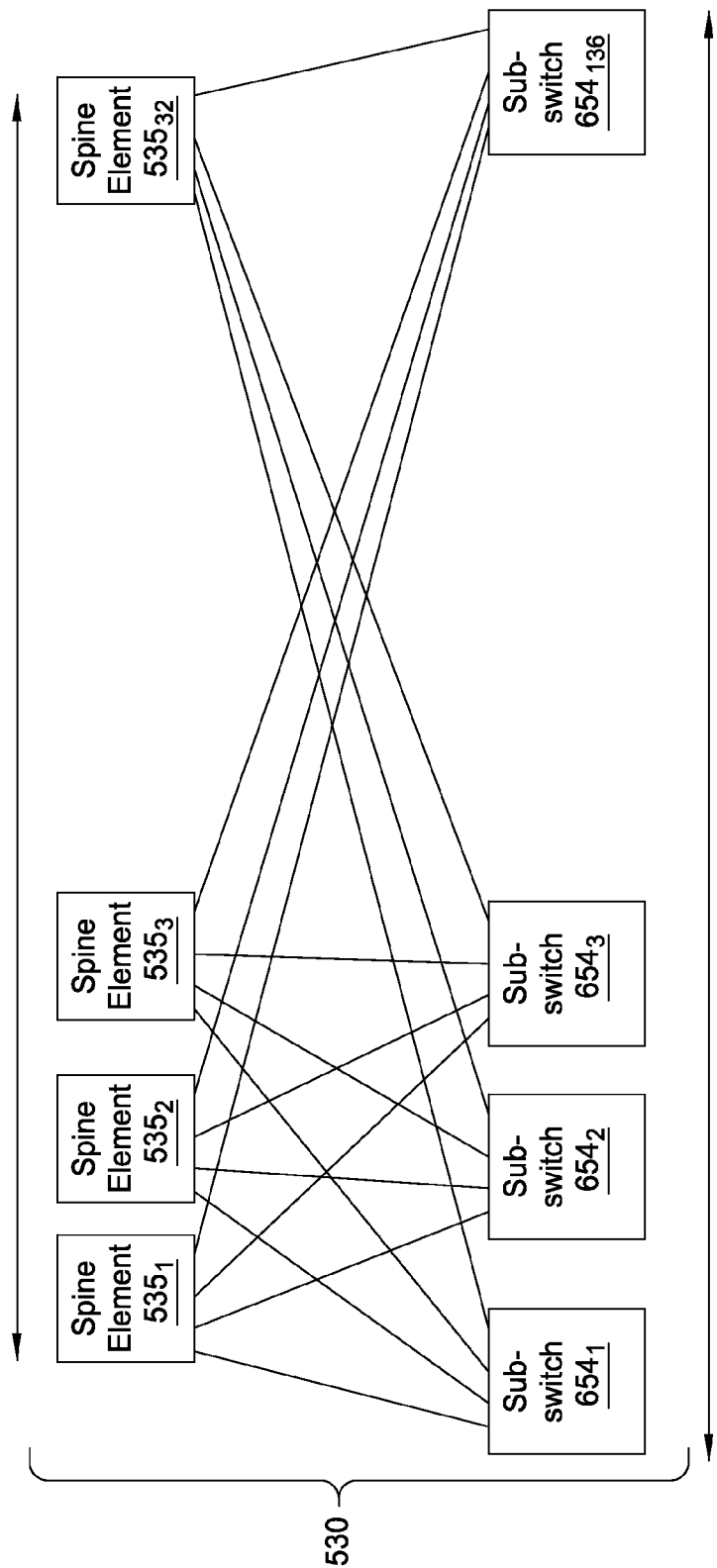
FIG. 7 illustrates a distributed, virtual switch, according to one embodiment described herein.

FIG. 7 illustrates the virtual switching layer 530, according to one embodiment described herein. As shown, the switching layer 530 may use a spine-leaf architecture where each sub-switch $654_{1-136}$ (i.e., a leaf node) is attached to at least one spine node $635_{1-32}$. The spine nodes $535_{1-32}$ route cells received from the sub-switch $654_N$ to the correct spine node which then forwards the data to the correct sub-switch $654_N$. That is, no matter the sub-switch $654_N$ used, a cell (i.e., data packet) can be routed to another other sub-switch $654_N$ located on any other switch module $654_{1-N}$. Although 136 sub-switches and 32 spine elements are illustrated in FIG. 7, embodiments disclosed herein are not limited to such a configuration, as broader ranges are contemplated.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method to implement a scheduling scheme for a crossbar scheduler configured to provide distributed request-grant-accept arbitration between input group arbiters and output group arbiters in a distributed switch, the method comprising:

receiving, at a output group arbiter communicably coupled to an output group, a request signal and a count from a input group arbiter communicably coupled to a first input group, the output group comprising a plurality of output ports of the distributed switch, the first input group comprising a plurality of input ports of the distributed switch, the request signal indicating that one or more of the input ports of the first input group arbiter have queued data packets targeting a set of output ports including a first output port of the output group arbiter, the count indicating a number of input ports of the first input group having queued data packets targeting the set of output ports; and performing a predefined arbitration operation for at least one input link of the first input group identified as having queued data packets targeting the set of output ports, wherein the predefined arbitration operation comprises:
issuing, by the output group arbiter, a signal granting the request to the input group arbiter;
decrementing the count;
transmitting a packet from the identified input link of the first input group; and
upon determining the count equals zero, selecting a second input group as a currently served input group.

2. The computer-implemented method of claim 1, wherein the first input group is different than the second input group, wherein the predefined arbitration operation is performed for each input link of the first input group.

3. The computer-implemented method of claim 2, wherein the count is decremented upon issuing the signal granting the request.

4. The computer-implemented method of claim 2, wherein the count is decremented only upon receiving an accept signal from the input group arbiter, wherein the second input group is selected as a currently served input group only upon receiving at least one accept signal from the input group arbiter.

5. The computer-implemented method of claim 4, wherein a separate request signal and a separate count are received for each output port of the output group in separate clock cycles.

6. The computer-implemented method of claim 5, wherein the count is received from a database storing respective counts of a plurality of input group arbiters, wherein the predefined arbitration operation is performed responsive to the received request signal.

7. The computer-implemented method of claim 6, further comprising selecting, by the output group arbiter, the first input group as a currently served input group.

8. The computer-implemented method of claim 7, wherein the first input group comprises four input ports, wherein the output group comprises four output ports, and wherein the second input group comprises four input ports.

9. A computer program product to implement a scheduling scheme for a crossbar scheduler configured to provide distributed request-grant-accept arbitration between input arbiters and output group arbiters in a distributed switch, the computer program product comprising:

a computer-readable storage medium having computer-readable program code embodied therewith, the computer-readable program code comprising:
computer-readable program code configured to receive, at a output group arbiter communicably coupled to an output group, a request signal and a count from a input group arbiter communicably coupled to a first input group, the output group comprising a plurality of output ports of the distributed switch, the first input group comprising a plurality of input ports of the distributed switch, the request signal indicating that one or more of the input ports of the first input group arbiter have queued data packets targeting a set of output ports including a first output port of the output group arbiter, the count indicating a number of input ports of the first input group having queued data packets targeting the set of output ports; and
computer-readable program code configured to perform a predefined arbitration a predefined arbitration operation for at least one input link of the first input group identified as having queued data packets targeting the set of output ports, wherein the predefined arbitration operation comprises:
issuing, by the output group arbiter, a signal granting the request to the input group arbiter;
decrementinq the count;
transmitting a packet from the identified input link of the first input group; and
upon determining the count equals zero, selecting a second input group as a currently served input group.

10. The computer program product of claim 9, wherein the first input group is different than the second input group, wherein the predefined arbitration operation is performed for each input link of the first input group.

11. The computer program product of claim 10, wherein the count is decremented upon issuing the signal granting the request.

12. The computer program product of claim 10, wherein the count is decremented only upon receiving an accept signal from the input group arbiter, wherein the second input group is selected as a currently served input group only upon receiving at least one accept signal from the input group arbiter.

13. The computer program product of claim 12, wherein a separate request signal and a separate count are received for each output port of the output group in respective clock cycles.

14. The computer program product of claim 13, wherein the count is received from a database storing respective counts of a plurality of input group arbiters, wherein the predefined arbitration operation is performed responsive to the received request signal.

15. The computer program product of claim 14, further comprising selecting, by the output group arbiter, the first input group as a currently served input group.

16. The computer program product of claim 15, wherein the first input group comprises four input ports, wherein the output group comprises four output ports, and wherein the second input group comprises four input ports.

17. A system to implement a scheduling scheme for a crossbar scheduler configured to provide distributed request-grant-accept arbitration between input group arbiters and output group arbiters in a distributed switch, the system comprising:

one or more computer processors; and
a memory containing a program which, when executed by the one or more computer processors, performs an operation comprising:
receiving, at a output group arbiter communicably coupled to an output group, a request signal and a count from a input group arbiter communicably coupled to a first input group, the output group comprising a plurality of output ports of the distributed switch, the first input group comprising a plurality of input ports of the distributed switch, the request signal indicating that one or more of the input ports of the first input group arbiter have queued data packets targeting a set of output ports including a first output port of the output group arbiter, the count indicating a number of input ports of the first input group having queued data packets targeting the set of output ports; and performing a predefined arbitration operation for at least one input link of the first input group identified as having queued data packets targeting the set of output ports, wherein the predefined arbitration operation comprises:
issuing, by the output group arbiter, a signal granting the request to the input group arbiter;
decrementing the count;
transmitting a packet from the identified input link of the first input group; and
upon determining the count equals zero, selecting a second input group as a currently served input group.

18. The system of claim 17, wherein the first input group is different than the second input group, wherein the predefined arbitration operation is performed for each input link of the first input group.

19. The system of claim 18, wherein the count is decremented upon issuing the signal granting the request.

20. The system of claim 18, wherein the count is decremented only upon receiving an accept signal from the input group arbiter, wherein the second input group is selected as a currently served input group only upon receiving at least one accept signal from the input group arbiter.

21. The system of claim 20, wherein a separate request signal and a separate count are received for each output port of the output group in respective clock cycles.

22. The system of claim 21, wherein the count is received from a database storing respective counts of a plurality of input group arbiters, wherein the predefined arbitration operation is performed responsive to the received request signal.

23. The system of claim 22, further comprising selecting, by the output group arbiter, the first input group as a currently served input group.

24. The system of claim 23, wherein the first input group comprises four input ports, wherein the output group comprises four output ports, and wherein the second input group comprises four input ports.

* * * * *